United States Patent
Maeda

(10) Patent No.: US 11,557,766 B2
(45) Date of Patent: Jan. 17, 2023

(54) BINDER COMPOSITION FOR ALL-SOLID-STATE SECONDARY BATTERY, SLURRY COMPOSITION FOR ALL-SOLID-STATE SECONDARY BATTERY, FUNCTIONAL LAYER FOR ALL-SOLID-STATE SECONDARY BATTERY, AND ALL-SOLID-STATE SECONDARY BATTERY

(71) Applicant: ZEON CORPORATION, Tokyo (JP)

(72) Inventor: Kouichirou Maeda, Tokyo (JP)

(73) Assignee: ZEON CORPORATION, Chiyoda-ku Tokyo (JP)

( * ) Notice: Subject to any disclaimer, the term of this patent is extended or adjusted under 35 U.S.C. 154(b) by 343 days.

(21) Appl. No.: 16/768,882

(22) PCT Filed: Dec. 4, 2018

(86) PCT No.: PCT/JP2018/044562
§ 371 (c)(1),
(2) Date: Jun. 2, 2020

(87) PCT Pub. No.: WO2019/116964
PCT Pub. Date: Jun. 20, 2019

(65) Prior Publication Data
US 2021/0167389 A1   Jun. 3, 2021

(30) Foreign Application Priority Data

Dec. 15, 2017   (JP) ............... JP2017-240974

(51) Int. Cl.
*H01M 4/62* (2006.01)
*H01M 10/0525* (2010.01)
*H01M 10/0562* (2010.01)

(52) U.S. Cl.
CPC ....... *H01M 4/622* (2013.01); *H01M 10/0525* (2013.01); *H01M 10/0562* (2013.01); *H01M 2300/0065* (2013.01)

(58) Field of Classification Search
CPC ......... H01M 10/0525; H01M 10/0562; H01M 2300/0065
See application file for complete search history.

(56) References Cited

U.S. PATENT DOCUMENTS

| | | | | |
|---|---|---|---|---|
| 2,875,166 | A * | 2/1959 | Hopkins | D06M 14/00 525/274 |
| 6,894,143 | B2 | 5/2005 | Nishio et al. | |
| 6,956,090 | B1 * | 10/2005 | Suau | C08F 2/10 526/317.1 |
| 2016/0149189 | A1 * | 5/2016 | Park | H01M 50/417 429/144 |
| 2018/0062162 | A1 | 3/2018 | Maeda | |

FOREIGN PATENT DOCUMENTS

| | | |
|---|---|---|
| JP | S59151770 A | 8/1984 |
| JP | H1150046 A | 2/1999 |
| JP | 4134617 B2 | 8/2008 |
| JP | 2009176484 A | 8/2009 |
| JP | 2009211950 A | 9/2009 |
| JP | 2012243476 A | 12/2012 |
| JP | 2013143299 A | 7/2013 |
| JP | 2016143614 A | 8/2016 |
| JP | 2016181471 A | 10/2016 |
| JP | 2016181472 A | 10/2016 |
| WO | 2014051032 A1 | 4/2014 |
| WO | 2015108109 A1 | 7/2015 |

OTHER PUBLICATIONS

Mar. 5, 2019, International Search Report issued in the International Patent Application No. PCT/JP2018/044562.

Jun. 16, 2020, International Preliminary Report on Patentability issued in the International Patent Application No. PCT/JP2018/044562.

Jun. 1, 2021, the Extended European Search Report issued by the European Patent Office in the corresponding European Patent Application No. 18887412.7.

* cited by examiner

*Primary Examiner* — Jayne L Mershon
(74) *Attorney, Agent, or Firm* — Kenja IP Law PC

(57) ABSTRACT

Provided are a binder composition for an all-solid-state secondary battery with which it is possible to obtain an all-solid-state secondary battery that has good battery characteristics and for which processability during all-solid-state secondary battery production is excellent, a slurry composition for an all-solid-state secondary battery that contains this binder composition for an all-solid-state secondary battery, a functional layer for an all-solid-state secondary battery that is formed from this slurry composition for an all-solid-state secondary battery, and an all-solid-state secondary battery that includes this functional layer for an all-solid-state secondary battery. The binder composition for an all-solid-state secondary battery contains a polymer, an unsaturated acid metal salt monomer, and a solvent. The unsaturated acid metal salt monomer includes a divalent metal.

8 Claims, No Drawings

BINDER COMPOSITION FOR ALL-SOLID-STATE SECONDARY BATTERY, SLURRY COMPOSITION FOR ALL-SOLID-STATE SECONDARY BATTERY, FUNCTIONAL LAYER FOR ALL-SOLID-STATE SECONDARY BATTERY, AND ALL-SOLID-STATE SECONDARY BATTERY

TECHNICAL FIELD

The present disclosure relates to a binder composition for an all-solid-state secondary battery, a slurry composition for an all-solid-state secondary battery, a functional layer for an all-solid-state secondary battery, and an all-solid-state secondary battery.

BACKGROUND

Demand for secondary batteries such as lithium ion batteries has been increasing in recent years for various applications such as mobile information terminals, mobile electronic devices, and other mobile terminals, and also domestic small power storage devices, electric two-wheelers, electric vehicles, and hybrid electric vehicles.

The widening use of secondary batteries in such applications has been accompanied by demand for further improvement of secondary battery safety. One effective method for ensuring further improvement of secondary battery safety is the use of a solid electrolyte.

Known examples of solid electrolytes include polymeric solid electrolytes in which polyethylene oxide or the like is used (for example, refer to Patent Literature (PTL) 1). However, such polymeric solid electrolytes leave room for improvement in terms that they are flammable materials.

For this reason, there is ongoing development of all-solid-state secondary batteries in which a solid electrolyte layer containing an inorganic solid electrolyte that is formed of a non-flammable inorganic material and that is extremely safe compared to a polymeric solid electrolyte is included in-between a positive electrode and a negative electrode (for example, refer to PTL 2).

A solid electrolyte layer of an all-solid-state lithium secondary battery is formed, for example, by a method (application method) in which a slurry composition for a solid electrolyte layer that contains solid electrolyte particles and a solvent is applied onto a positive electrode or a negative electrode and is then dried (for example, refer to PTL 3 and 4). In a case in which a solid electrolyte layer is formed by an application method in this manner, it is necessary for the viscosity and fluidity of a slurry composition containing an active material and/or a solid electrolyte to be within ranges that enable application thereof and it is also necessary for a binder composition for an all-solid-state secondary battery, or the like, other than the active material and/or solid electrolyte, to be added in an electrode or a solid electrolyte layer obtained through drying of solvent after slurry composition application in order to cause good battery characteristics to be displayed. However, it has not yet been possible to obtain a binder composition for an all-solid-state secondary battery with which it is possible to achieve a slurry composition that has a viscosity and a fluidity within ranges that enable application and that causes good battery characteristics to be displayed.

CITATION LIST

Patent Literature

PTL 1: JP4134617B
PTL 2: JPS59151770A
PTL 3: JP2009176484A
PTL 4: JP2009211950A

SUMMARY

Technical Problem

An object of the present disclosure is to provide a binder composition for an all-solid-state secondary battery with which it is possible to obtain an all-solid-state secondary battery that has good battery characteristics and for which processability during all-solid-state secondary battery production is excellent.

Another object of the present disclosure is to provide a slurry composition for an all-solid-state secondary battery that contains this binder composition for an all-solid-state secondary battery.

Another object of the present disclosure is to provide a functional layer for an all-solid-state secondary battery that is formed from this slurry composition for an all-solid-state secondary battery.

Another object of the present disclosure is to provide an all-solid-state secondary battery that includes this functional layer for an all-solid-state secondary battery.

Solution to Problem

As a result of diligent investigation, the inventor discovered that by using an unsaturated acid metal salt monomer including a divalent metal, it is possible to obtain a slurry composition for an all-solid-state secondary battery having good dispersion stability even at high concentration with a solid content concentration of 50 mass % or more, to obtain a functional layer for an all-solid-state secondary battery having good pressability that is formed using this slurry composition for an all-solid-state secondary battery, and to reduce a resistance value of an all-solid-state secondary battery including a functional layer for an all-solid-state secondary battery (i.e., it is possible to obtain an all-solid-state secondary battery that has good battery characteristics and for which processability during all-solid-state secondary battery production is excellent). In this manner, the inventor completed the present disclosure.

Thus, the present disclosure provides the binder composition for an all-solid-state secondary battery, slurry composition for an all-solid-state secondary battery, functional layer for an all-solid-state secondary battery, and all-solid-state secondary battery set forth below.

The present disclosure aims to advantageously solve the problems set forth above, and a presently disclosed binder composition for an all-solid-state secondary battery comprises a polymer, an unsaturated acid metal salt monomer, and a solvent, wherein the unsaturated acid metal salt monomer includes a divalent metal. When a binder composition for an all-solid-state secondary battery contains a polymer, an unsaturated acid metal salt monomer including a divalent metal, and a solvent in this manner, it is possible to obtain an all-solid-state secondary battery that has good battery characteristics and for which processability during all-solid-state secondary battery production is excellent.

In the presently disclosed binder composition for an all-solid-state secondary battery, the unsaturated acid metal salt monomer is preferably contained in a proportion of not less than 0.01 parts by mass and not more than 10 parts by mass per 100 parts by mass of the polymer. When the unsaturated acid metal salt monomer is contained in a proportion of not less than 0.01 parts by mass and not more than 10 parts by mass per 100 parts by mass of the polymer, an effect of addition of the unsaturated acid metal salt monomer (effect of enabling increased solid content concentration of a slurry composition for an all-solid-state secondary battery) can be obtained, and aggregation of particles of the polymer (binder aggregation) can be inhibited.

In the presently disclosed binder composition for an all-solid-state secondary battery, the divalent metal is preferably at least one selected from calcium, magnesium, copper, and zinc. When the divalent metal is at least one selected from calcium, magnesium, copper, and zinc, it is possible to obtain an all-solid-state secondary battery that has better battery characteristics and for which processability during all-solid-state secondary battery production is even better.

In the presently disclosed binder composition for an all-solid-state secondary battery, the unsaturated acid metal salt monomer preferably includes at least two double bonds. When the unsaturated acid metal salt monomer includes at least two double bonds, it is possible to obtain an all-solid-state secondary battery that has better battery characteristics and for which processability during all-solid-state secondary battery production is even better.

In the presently disclosed binder composition for an all-solid-state secondary battery, the unsaturated acid metal salt monomer is preferably a metal (meth)acrylate monomer. When the unsaturated acid metal salt monomer is a metal (meth)acrylate monomer, it is possible to obtain an all-solid-state secondary battery that has better battery characteristics and for which processability during all-solid-state secondary battery production is even better.

The present disclosure also aims to advantageously solve the problems set forth above, and a presently disclosed slurry composition for an all-solid-state secondary battery comprises: the binder composition for an all-solid-state secondary battery set forth above; and a solid electrolyte. Inclusion of the binder composition for an all-solid-state secondary battery set forth above and a solid electrolyte in this manner can improve dispersion stability of the slurry composition for an all-solid-state secondary battery.

The present disclosure also aims to advantageously solve the problems set forth above, and a presently disclosed functional layer for an all-solid-state secondary battery is formed from the slurry composition for an all-solid-state secondary battery set forth above. By forming the functional layer for an all-solid-state secondary battery from the slurry composition for an all-solid-state secondary battery set forth above in this manner, pressability of the functional layer for an all-solid-state secondary battery can be improved.

The present disclosure also aims to advantageously solve the problems set forth above, and a presently disclosed all-solid-state secondary battery comprises the functional layer for an all-solid-state secondary battery set forth above. Inclusion of the functional layer for an all-solid-state secondary battery set forth above in this manner can reduce a resistance value of the all-solid-state secondary battery.

Advantageous Effect

According to the present disclosure, it is possible to obtain a binder composition for an all-solid-state secondary battery with which it is possible to obtain an all-solid-state secondary battery that has good battery characteristics and for which processability during all-solid-state secondary battery production is excellent, a slurry composition for an all-solid-state secondary battery that contains this binder composition for an all-solid-state secondary battery, a functional layer for an all-solid-state secondary battery that is formed from this slurry composition for an all-solid-state secondary battery, and an all-solid-state secondary battery that includes this functional layer for an all-solid-state secondary battery.

DETAILED DESCRIPTION (Binder Composition for all-Solid-State Secondary Battery)

The following describes the presently disclosed binder composition for an all-solid-state secondary battery. Features of the presently disclosed binder composition for an all-solid-state secondary battery are that the binder composition contains a polymer, an unsaturated acid metal salt monomer, and a solvent, and the unsaturated acid metal salt monomer includes a divalent metal.

The solid content concentration of the binder composition for a solid electrolyte battery used in the present disclosure is preferably 1 mass % or more, more preferably 3 mass % or more, and more preferably 5.6 mass % or more, and is preferably 40 mass % or less, more preferably 15 mass % or less, and more preferably 7 mass % or less. When the solid content concentration of the binder composition for a solid electrolyte battery is 1 mass % or more, it is possible to obtain a slurry that can easily be applied. Moreover, when the solid content concentration of the binder composition for a solid electrolyte battery is 40 mass % or less, this can facilitate handling such as weighing.

In the presently disclosed binder composition for an all-solid-state secondary battery, in a case in which the polymer is present in an aqueous dispersion, it is necessary to perform solvent exchange of the water with an organic solvent. The solvent exchange can be performed by a commonly known method such as a method in which the aqueous dispersion of the polymer and the organic solvent are loaded into a rotary evaporator, the pressure is lowered, and solvent exchange and dehydration are performed at a certain temperature.

Note that the water content in the organic solvent containing the polymer after solvent exchange (i.e., the binder composition water content) is preferably less than 1,000 ppm, more preferably less than 500 ppm, even more preferably less than 100 ppm, further preferably 95 ppm or less, particularly preferably 90 ppm or less, and most preferably 85 ppm or less.

The presently disclosed binder composition for an all-solid-state secondary battery is used in at least one of a positive electrode active material layer, a negative electrode active material layer, and a solid electrolyte layer. Note that a positive electrode includes a positive electrode active material layer on a current collector, whereas a negative electrode includes a negative electrode active material layer on a current collector. Moreover, a positive electrode active material layer and a negative electrode active material layer may be referred to by the general term "electrode active material layer".

<Polymer>

In a case in which the presently disclosed binder composition for an all-solid-state secondary battery is used in a solid electrolyte layer, for example, the polymer contained in the binder composition for an all-solid-state secondary battery is used in order to bind together a solid electrolyte contained in the solid electrolyte layer and thereby form the solid electrolyte layer.

The polymer contained in the presently disclosed binder composition for an all-solid-state secondary battery is preferably a particulate polymer that is obtained through polymerization or copolymerization of a monomer composition.

[Particulate Polymer]

The average particle diameter of the particulate polymer is preferably 0.1 μm or more, and more preferably 0.15 μm or more, and is preferably 1 μm or less, and more preferably 0.70 μm or less. This is because the number of contact points and the contact area between solid electrolyte particles increase, and, as a result, internal resistance decreases when the average particle diameter of the particulate polymer is not less than 0.1 μm and not more than 1 μm. Note that the average particle diameter of the particulate polymer is the number-average particle diameter, which can be determined through measurement of a particle size distribution by laser diffraction.

The glass-transition temperature of the particulate polymer is preferably 0° C. or lower, more preferably −10° C. or lower, and particularly preferably −32° C. or lower, and is preferably −60° C. or higher, more preferably −50° C. or higher, and particularly preferably −43° C. or higher. When the glass-transition temperature of the particulate polymer is 0° C. or lower, it is possible to inhibit a phenomenon of the glass-transition temperature being excessively high and close adhesion strength being insufficient. Moreover, when the glass-transition temperature of the particulate polymer is −60° C. or higher, reduction of battery performance at low temperature can be inhibited.

The type of the particulate polymer is not specifically limited and suitable examples thereof include a conjugated diene polymer and a (meth)acrylate polymer.

[[Conjugated Diene Polymer]]

The conjugated diene polymer is not specifically limited so long as it is a polymer that includes a conjugated diene monomer unit obtained through polymerization of a conjugated diene monomer, and may be either a conjugated diene homopolymer or a conjugated diene copolymer.

Note that the conjugated diene homopolymer and the conjugated diene copolymer can be used individually as the conjugated diene polymer, or two or more types thereof can be used in combination as the conjugated diene polymer.

—Conjugated Diene Homopolymer—

The conjugated diene homopolymer is not specifically limited so long as it is a polymer obtained through polymerization of only a conjugated diene monomer, and may be a typical conjugated diene homopolymer that is used in industry such as polybutadiene, polyisoprene, polycyanobutadiene, or polypentadiene.

One of the conjugated diene homopolymers described above may be used individually, or two or more of the conjugated diene homopolymers described above may be used in combination in a freely selected ratio.

Of these conjugated diene homopolymers, polybutadiene and polyisoprene are preferable in terms of availability, with polybutadiene being more preferable.

Examples of conjugated diene monomers that can form a conjugated diene monomer unit in the conjugated diene homopolymer include 1,3-butadiene, isoprene, 2,3-dimethyl-1,3-butadiene, 1,3-pentadiene, 1,3-hexadiene, chloroprene, and cyanobutadiene. One of the conjugated diene monomers described above may be used individually, or two or more of the conjugated diene monomers described above may be used in combination in a freely selected ratio.

Of these conjugated diene monomers, 1,3-butadiene and isoprene are preferable in terms availability, with 1,3-butadiene being more preferable.

The method of polymerization of the conjugated diene monomer is selected as appropriate depending on the objective of use without any specific limitations.

—Conjugated Diene Copolymer—

The conjugated diene copolymer is not specifically limited so long as it is a copolymer that includes at least a conjugated diene monomer unit (monomer unit formed from a conjugated diene monomer). Examples of conjugated diene monomers that can be used to form the conjugated diene monomer unit include the same conjugated diene monomers as can be used in polymerization of the previously described conjugated diene homopolymer.

Any monomer that is copolymerizable with a conjugated diene monomer can be used without any specific limitations as a monomer forming a monomer unit other than the conjugated diene monomer unit in the conjugated diene copolymer. Examples thereof include cyano group-containing vinyl monomers, amino group-containing vinyl monomers, pyridyl group-containing vinyl monomers, alkoxyl group-containing vinyl monomers, and aromatic vinyl monomers. One of the above-described monomers that are copolymerizable with a conjugated diene monomer may be used individually, or two or more of these monomers may be used in combination in a freely selected ratio.

Of these monomers, aromatic vinyl monomers and cyano group-containing vinyl monomers are preferable in terms of reactivity, with aromatic vinyl monomers being more preferable.

In a case in which the conjugated diene copolymer includes an aromatic vinyl monomer unit and a conjugated diene monomer unit (i.e., the conjugated diene copolymer is a copolymer of an aromatic vinyl compound and a conjugated diene compound), vinyl structures derived from the conjugated diene compound preferably constitute 10 mass % or more of structural units derived from the conjugated diene compound, and preferably constitute 60 mass % or less of structural units derived from the conjugated diene compound.

—Aromatic Vinyl Monomer—

Examples of aromatic vinyl monomers include styrene, α-methylstyrene, 2-methylstyrene, 3-methylstyrene, 4-methylstyrene, 2,4-diisopropylstyrene, 2,4-dimethylstyrene, 4-t-butyl styrene, 5-t-butyl-2-methylstyrene, N,N-dimethylaminoethyl styrene, and N,N-diethylaminoethylstyrene. One of the aromatic vinyl monomers described above may be used individually, or two or more of the aromatic vinyl monomers described above may be used in combination in a freely selected ratio.

Of these aromatic vinyl monomers, styrene and α-methylstyrene are preferable.

—Cyano Group-Containing Vinyl Monomer—

Examples of cyano group-containing vinyl monomers include acrylonitrile and methacrylonitrile. One of the cyano group-containing vinyl monomers described above may be used individually, or two or more of the cyano group-containing vinyl monomers described above may be used in combination in a freely selected ratio.

Proportions in the conjugated diene copolymer constituted by a monomer unit derived from the conjugated diene monomer and a monomer unit derived from a monomer that is copolymerizable with the conjugated diene monomer can be selected as appropriate depending on the objective and are preferably such that the mass ratio of "monomer unit derived from conjugated diene monomer/monomer unit derived from monomer copolymerizable with conjugated diene monomer" is 70/30 to 100/0, and more preferably 80/20 to 100/0. When the mass ratio of "monomer unit derived from conjugated diene monomer/monomer unit derived from monomer copolymerizable with conjugated diene monomer" is 70/30 to 100/0, it is possible to obtain an all-solid-state secondary battery that has better battery characteristics and for which processability during all-solid-state secondary battery production is even better.

[[(Meth)Acrylate Polymer]]

The (meth)acrylate polymer is not specifically limited so long as it is a polymer that is obtained through polymerization of a (meth)acrylate monomer. Note that in the present disclosure, "(meth)acrylate" is used to indicate "acrylate" or "methacrylate".

—(Meth)Acrylate Monomer—

Examples of (meth)acrylate monomers include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, 2-ethylhexyl acrylate, 2-methoxyethyl acrylate, and 2-ethoxyethyl acrylate; 2-(perfluoroalkyl)ethyl acrylates such as 2-(perfluorobutyl)ethyl acrylate and 2-(perfluoropentyl)ethyl acrylate; methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, and 2-ethylhexyl methacrylate; 2-(perfluoroalkyl)ethyl methacrylates such as 2-(perfluorobutyl)ethyl methacrylate and 2-(perfluoropentyl)ethyl methacrylate; benzyl acrylate; and benzyl methacrylate. One of the (meth)acrylate monomers described above may be used individually, or two or more of the (meth)acrylate monomers described above may be used in combination in a freely selected ratio.

Of these (meth)acrylate monomers, n-butyl acrylate, t-butyl acrylate, and 2-ethylhexyl acrylate are preferable in terms of reactivity.

Any monomer that is copolymerizable with a (meth) acrylate monomer can be used without any specific limitations as a monomer forming a monomer unit other than the (meth)acrylate monomer unit (monomer unit formed from a (meth)acrylate monomer) in the (meth)acrylate polymer. Examples thereof include unsaturated carboxylic acids such as acrylic acid, methacrylic acid, itaconic acid, and fumaric acid; styrenic monomers such as styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, and divinylbenzene; amide monomers such as acrylamide, N-methylolacrylamide, and acrylamido-2-methylpropane sulfonic acid; α,β-unsaturated nitrile compounds such as acrylonitrile and methacrylonitrile; olefins such as ethylene and propylene; diene monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and heterocycle-containing vinyl compounds such as N-vinylpyrrolidone, vinylpyridine, and vinylimidazole. Note that one monomer may be used individually or two or more monomers may be used in combination in a freely selected ratio as the monomer forming a monomer unit other than the (meth)acrylate monomer unit (monomer unit formed from a (meth)acrylate monomer) in the (meth)acrylate polymer.

Moreover, a monomer that forms a monomer unit other than the (meth)acrylate monomer unit (monomer unit formed from a (meth)acrylate monomer) in the (meth) acrylate polymer and that has a plurality of functional groups can be used as a cross-linker. Examples of monomers that can be used as cross-linkers include carboxylic acid esters including at least two carbon-carbon double bonds such as ethylene glycol dimethacrylate (EGDMA), diethylene glycol dimethacrylate, and trimethylolpropane triacrylate; and glycidyl group-containing monomers such as glycidyl acrylate, glycidyl methacrylate, and allyl glycidyl ether.

By adding an appropriate amount of a cross-linker such as ethylene glycol dimethacrylate (EGDMA), the overall system hardens, reduction of binding strength of the binder can be inhibited, and the occurrence of cracking and chipping can be inhibited.

[Production Method of Particulate Polymer]

The method by which the particulate polymer is produced is not specifically limited and may be emulsion polymerization, suspension polymerization, or the like, for example.

Of these methods, emulsion polymerization is preferable in terms of ease of particle diameter control. Note that in emulsion polymerization, monomer(s) are emulsion polymerized in an aqueous dispersion of seed particles, for example.

The polymerization process may be a batch process, a semi-continuous process, or a continuous process. Commonly known conditions can be adopted for the polymerization pressure, polymerization temperature, and polymerization time.

[[Emulsion Polymerization]]

The emulsion polymerization is normally carried out by a standard method. For example, the emulsion polymerization may be carried out by a method described in Vol. 28 of "Experimental Chemistry" (published by Maruzen; edited by The Chemical Society of Japan). Specifically, the emulsion polymerization may be a method in which (i) water, (ii) additives such as a dispersant, an emulsifier, and a cross-linker, (iii) a polymerization initiator, and (iv) a monomer solution are loaded into a sealed vessel equipped with a stirrer and a heating device such as to have a specific composition, the monomer composition in the vessel is stirred to emulsify monomer and the like in the water, and the temperature is raised under stirring to initiate polymerization. Alternatively, the emulsion polymerization may be a method in which the monomer composition is loaded into a sealed vessel after being emulsified and then a reaction is initiated in the same manner as described above. In the emulsion polymerization, various additives such as surfactants (emulsifiers), polymerization initiators, molecular weight modifiers (chain transfer agents), chelating agents, electrolytes, and oxygen scavengers that are typically used in emulsion polymerization reactions can be used as auxiliary materials for polymerization.

—Surfactant (Emulsifier)—

Any surfactant (emulsifier) can be used in the emulsion polymerization so long as the desired particulate polymer is obtained. Examples include sodium dodecylbenzenesulfonate (DBS), sodium lauryl sulfate, sodium dodecyl diphenyl ether disulfonate, and sodium dialkyl sulfosuccinate. One of the surfactants described above may be used individually, or two or more of the surfactants described above may be used in combination in a freely selected ratio.

Although any amount of the surfactant described above can be used so long as the desired particulate polymer is obtained, the amount thereof per 100 parts by mass of the total amount of monomers used to produce the particulate polymer is preferably 0.5 parts by mass or more, and more preferably 1 part by mass or more, and is preferably 10 parts by mass or less, and more preferably 5 parts by mass or less. When the amount of the surfactant is 0.5 parts by mass or more, the emulsion polymerization can be performed stably. Moreover, when the amount of the surfactant is 10 parts by mass or less, the influence thereof on a battery can be reduced.

—Polymerization Initiator—

A polymerization initiator is normally used in the polymerization reaction. The polymerization initiator can be any polymerization initiator so long as the desired particulate polymer is obtained. Examples of polymerization initiators that can be used include sodium persulfate (NaPS), ammonium persulfate (APS), and potassium persulfate (KPS). One of the polymerization initiators described above may be used individually, or two or more of the polymerization initiators described above may be used in combination in a freely selected ratio.

Of these polymerization initiators, sodium persulfate and potassium persulfate are preferable, and potassium persulfate is more preferable in terms that deterioration of cycle characteristics of an obtained all-solid-state secondary battery can be inhibited.

—Chain Transfer Agent (Molecular Weight Modifier)—

A chain transfer agent (molecular weight modifier) may be contained in the polymerization system during the polymerization reaction. Examples of chain transfer agents (molecular weight modifiers) that can be used include alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen disulfide and diisopropyl xanthogen disulfide; terpinolene; thiuram compounds such as tetramethylthiuram di sulfide, tetraethylthiuram di sulfide, and tetramethylthiuram monosulfide; phenolic compounds such as 2,6-di-t-butyl-4-methylphenol and styrenated phenol; allyl compounds such as allyl alcohol; halogenated hydrocarbon compounds such as dichloromethane, dibromomethane, and carbon tetrabromide; thio compounds such as thioglycolic acid, thiomalic acid, and 2-ethylhexyl thioglycolate; diphenylethylene; and α-methylstyrene dimer. One of the molecular weight modifiers or chain transfer agents described above may be used individually, or two or more of the molecular weight modifiers or chain transfer agents described above may be used in combination in a freely selected ratio.

<Unsaturated Acid Metal Salt Monomer>

The unsaturated acid metal salt monomer is not specifically limited so long as it includes a divalent metal and may, for example, be a metal (meth)acrylate monomer such as calcium dimethacrylate, magnesium dimethacrylate, copper dimethacrylate, zinc dimethacrylate, calcium diacrylate, magnesium diacrylate, copper diacrylate, or zinc diacrylate.

One of the unsaturated acid metal salt monomers described above may be used individually, or two or more of the unsaturated acid metal salt monomers described above may be used in combination in a freely selected ratio.

Of these unsaturated acid metal salt monomers, magnesium diacrylate and copper diacrylate are preferable, and magnesium diacrylate is more preferable in terms of being water-soluble.

The number of double bonds in the unsaturated acid metal salt monomer is preferably 2 or more, and is more preferably 2.

Note that addition of the unsaturated acid metal salt monomer is presumed so enable cross-linking of the surface of the polymer without reducing dispersion stability of the polymer.

The proportion in which the unsaturated acid metal salt monomer described above is contained per 100 parts by mass of the polymer is preferably 0.01 parts by mass or more, more preferably 0.1 parts by mass or more, and particularly preferably 0.3 parts by mass or more, and is preferably 10 parts by mass or less, more preferably 5 parts by mass or less, particularly preferably 4 parts by mass or less, and most preferably 3 parts by mass or less. When the unsaturated acid metal salt monomer is contained in a proportion of 0.01 parts by mass or more per 100 parts by mass of the polymer, an effect of addition of the unsaturated acid metal salt monomer (effect of enabling increased solid content concentration of a slurry composition for an all-solid-state secondary battery) can be obtained. Moreover, when the unsaturated acid metal salt monomer is contained in a proportion of 10 parts by mass or less per 100 parts by mass of the polymer, it is possible to inhibit aggregation of particles of the polymer (binder aggregation) due to the formation of a cross-linked structure at polymer particle surfaces.

<Solvent>

Although no specific limitations are placed on the solvent contained in the presently disclosed binder composition for an all-solid-state secondary battery, an organic solvent having a boiling point of not lower than 100° C. and not higher than 250° C. is suitable, for example.

Suitable examples of organic solvents having a boiling point of not lower than 100° C. and not higher than 250° C. include aromatic hydrocarbons such as toluene (boiling point: 111° C.) and xylene (boiling point: 144° C.); ethers such as cyclopentyl methyl ether (boiling point: 106° C.); and esters such as butyl acetate (boiling point: 126° C.) and butyl butyrate (boiling point: 164° C.).

In the case of an organic solvent having a boiling point of higher than 250° C., a higher temperature is required in a drying step during production of an electrode or the like, which leads to problems such as increased apparatus size.

One of the organic solvents having a boiling point of not lower than 100° C. and not higher than 250° C. described above may be used individually, or two or more of these organic solvents may be used in combination in a freely selected ratio.

Of these organic solvents, xylene is preferable in terms of ease of acquisition.

Moreover, the organic solvent used in solvent exchange from water to an organic solvent described above is preferably any of the organic solvents having a boiling point of not lower than 100° C. and not higher than 250° C. that are given as examples above.

Through use of the presently disclosed binder composition for an all-solid-state secondary battery, it is possible to obtain an all-solid-state secondary battery that has good battery characteristics and for which processability during all-solid-state secondary battery production is excellent.

(Slurry Composition for all-Solid-State Secondary Battery)

The presently disclosed slurry composition for an all-solid-state secondary battery contains the presently disclosed binder composition for an all-solid-state secondary battery set forth above, and a solid electrolyte.

The solid content concentration of the presently disclosed slurry composition for an all-solid-state secondary battery is preferably 40 mass % or more, more preferably 55 mass % or more, particularly preferably 60 mass % or more, and most preferably 62 mass % or more, and is preferably 70 mass % or less, and more preferably 65 mass % or less. When the solid content concentration of the slurry composition for an all-solid-state secondary battery is 40 mass % or more, it is possible to facilitate a process of application and drying, shorten drying time, and reduce the amount of heat that is necessary for drying, and thus it is possible to improve processability during all-solid-state secondary battery production.

<Solid Electrolyte>

The solid electrolyte is normally in a particulate form as a result of having undergone pulverization. The term "particulate form" as used herein refers to an indeterminate shape rather than a completely spherical shape.

The size of solid electrolyte particles is normally measured as an average particle diameter by a method in which the particles are irradiated with laser light and then scattered light is measured, for example. In this situation, the particle diameter is a value that presumes that the particles have a spherical shape. When multiple particles are measured together, the proportion of particles having a certain particle diameter can be expressed as a particle size distribution.

The average particle diameter of the solid electrolyte particles is preferably 0.3 μm or more, more preferably 0.5 μm or more, and particularly preferably 1.0 μm or more, and is preferably 1.3 μm or less, and more preferably 1.2 μm or less from a viewpoint of dispersibility and coatability of the slurry composition for a solid-state secondary battery. Note that the average particle diameter of the solid electrolyte particles is the number-average particle diameter, which can be determined through measurement of a particle size distribution by laser diffraction.

Crystalline inorganic lithium ion conductors, amorphous inorganic lithium ion conductors, and the like can suitably be used without any specific limitations as the solid electrolyte.

One of the solid electrolytes described above may be used individually, or two or more of the solid electrolytes described above may be used in combination in a freely selected ratio.

Of these solid electrolytes, amorphous inorganic lithium ion conductors are preferable in terms of electrical conductivity.

[Crystalline Inorganic Lithium Ion Conductor]

Examples of crystalline inorganic lithium ion conductors include, but are not specifically limited to, $Li_3N$, LISICON ($Li_{14}Zn(GeO_4)_4$), perovskite-type $Li_{0.5}La_{0.5}TiO_3$, garnet-type $Li_7La_3Zr_2O_{10}$, LIPON ($Li_{3+y}PO_{4-x}N_x$), and Thio-LISICON ($Li_{3.25}Ge_{0.25}P_{0.75}S_4$).

[Amorphous Inorganic Lithium Ion Conductor]

Examples of amorphous inorganic lithium ion conductors include, but are not specifically limited to, glass Li—Si—S—O and Li—P—S.

Of these amorphous inorganic lithium ion conductors, those that contain S (sulfur atom) and exhibit ion conductivity (i.e., sulfide solid electrolyte materials) are preferable.

In a case in which the all-solid-state secondary battery in which the presently disclosed binder composition for an all-solid-state secondary battery is to be used is an all-solid-state lithium secondary battery, an amorphous sulfide containing Li and P is preferable as the sulfide solid electrolyte material, and a raw material composition containing $Li_2S$ and a sulfide of an element belonging to any of groups 13 to 15 is more preferable as the sulfide solid electrolyte material. The method by which the sulfide solid electrolyte material is synthesized using such a raw material composition may be an amorphization method such as mechanical milling or melt quenching. Of these methods, mechanical milling is preferable in terms that it enables processing at normal temperature and simplification of the production process.

An amorphous sulfide containing Li and P has high lithium ion conductivity, and thus can reduce internal resistance of a battery and improve output characteristics when used as an inorganic solid electrolyte.

The amorphous sulfide containing Li and P is preferably sulfide glass composed of $Li_2S$ and $P_2S_5$, and more preferably sulfide glass produced from a mixed raw material of $Li_2S$ and $P_2S_5$ in which the molar ratio of $Li_2S:P_2S_5$ is 65:35 to 85:15 from a viewpoint of reducing internal resistance and improving output characteristics of a battery. Moreover, the amorphous sulfide containing Li and P is preferably sulfide glass-ceramic obtained by reacting a mixed raw material of $Li_2S$ and $P_2S_5$ in which the molar ratio of $Li_2S:P_2S_5$ is 65:35 to 85:15 by a mechanochemical method. From a viewpoint of maintaining high lithium ion conductivity, the molar ratio of $Li_2S:P_2S_5$ in the mixed raw material is preferably 68:32 to 80:20.

The sulfide of an element belonging to any of groups 13 to 15 may be $Al_2S_3$, $SiS_2$, $GeS_2$, $P_2S_3$, $P_2S_5$, $As_2S_3$, $Sb_2S_3$, or the like, for example.

One of the sulfides of an element belonging to any of groups 13 to 15 described above may be used individually, or two or more of these sulfides may be used in combination in a freely selected ratio.

Of these sulfides, a group 14 or 15 sulfide is preferable, and $P_2S_5$ is more preferable from a viewpoint of reducing internal resistance and improving output characteristics of a battery.

[[Sulfide Solid Electrolyte Material]]

The sulfide solid electrolyte material obtained using a raw material composition containing $Li_2S$ and a sulfide of an element belonging to any of groups 13 to 15 may, for example, be a $Li_2S$—$P_2S_5$ material, a $Li_2S$—$SiS_2$ material, a $Li_2S$—$GeS_2$ material, or a $Li_2S$—$Al_2S_3$ material.

Of these sulfide solid electrolyte materials, a $Li_2S$—$P_2S_5$ material is preferable in terms of having excellent Li ion conductivity.

Note that the sulfide solid electrolyte material may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The addition of such a sulfide can stabilize a glass component in the sulfide solid electrolyte material.

In the same manner, the sulfide solid electrolyte material may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. Inclusion of such an ortho-oxoacid lithium salt can stabilize a glass component in the sulfide solid electrolyte material.

The molar fraction of $Li_2S$ in the sulfide solid electrolyte material such as a $Li_2S$—$P_2S_5$ material, a $Li_2S$—$SiS_2$ material, a $Li_2S$—$GeS_2$ material, or a $Li_2S$—$Al_2S_3$ material is preferably 50% or more, and more preferably 60% or more, and is preferably 74% or less from a viewpoint of more reliably obtaining a sulfide solid electrolyte material including bridging sulfur.

The sulfide solid electrolyte material preferably includes bridging sulfur from a viewpoint of increasing ion conductivity. The inclusion of bridging sulfur can be judged by considering, for example, measurement results of Raman spectroscopy, the composition ratio of raw material, measurement results of NMR, or the like.

Note that when a sulfide solid electrolyte material includes bridging sulfur, it is normally the case that it has high reactivity with a positive electrode active material, and a high-resistance layer is readily formed. However, since the binder composition for an all-solid-state secondary battery normally contains a copolymer including an aromatic vinyl compound monomer unit and a conjugated diene compound monomer unit, an effect of the present disclosure with regard to inhibiting high-resistance layer formation can be sufficiently displayed.

Furthermore, the sulfide solid electrolyte material may be sulfide glass, or may be crystallized sulfide glass obtained through heat treatment of this sulfide glass. The "sulfide glass" can be obtained by any of the previously described amorphization methods, for example. The crystallized sulfide glass can be obtained by subjecting sulfide glass to heat treatment, for example.

The crystallized sulfide glass is preferably crystallized sulfide glass represented by $Li_7P_3S_{11}$ in terms of Li ion conductivity. $Li_7P_3S_{11}$ can be synthesized by, for example, mixing $Li_2S$ and $P_2S_5$ in a molar ratio of 70:30, performing amorphization using a ball mill to synthesize sulfide glass, and subjecting the obtained sulfide glass to heat treatment at a temperature of 150° C. to 360° C. to synthesize the $Li_7P_3S_{11}$.

(Functional Layer for all-Solid-State Secondary Battery)

The presently disclosed functional layer for an all-solid-state secondary battery is formed using the presently disclosed slurry composition for an all-solid-state secondary battery set forth above, and refers to at least one, preferably all, of a positive electrode active material layer, a negative electrode active material layer, and a solid electrolyte layer.

The presently disclosed functional layer for an all-solid-state secondary battery is, for example, a solid electrolyte layer that is formed by applying the presently disclosed slurry composition for an all-solid-state secondary battery set forth above onto a subsequently described positive electrode active material layer or negative electrode active material layer, and then drying the slurry composition.

(All-Solid-State Secondary Battery)

The presently disclosed all-solid-state secondary battery includes the presently disclosed functional layer for an all-solid-state secondary battery set forth above. In other words, the presently disclosed all-solid-state secondary battery is obtained by forming at least one layer among a positive electrode active material layer, a negative electrode active material layer, and a solid electrolyte layer using the presently disclosed binder composition for an all-solid-state secondary battery, and is preferably obtained by forming all of these layers using the presently disclosed binder composition for an all-solid-state secondary battery. The presently disclosed all-solid-state secondary battery normally includes: a positive electrode that includes a positive electrode active material layer; a negative electrode that includes a negative electrode active material layer; and a solid electrolyte layer that is formed between the positive and negative electrode active material layers. The positive electrode includes the positive electrode active material layer on a current collector, whereas the negative electrode includes the negative electrode active material layer on a current collector. The following describes the solid electrolyte layer, the positive electrode active material layer, and the negative electrode active material layer.

<Solid Electrolyte Layer>

In a case in which the presently disclosed functional layer for an all-solid-state secondary battery is used as the solid electrolyte layer, the solid electrolyte layer is formed by applying a slurry composition for a solid electrolyte layer onto the surface of a subsequently described positive or negative electrode active material layer, and then drying the slurry composition. The slurry composition for a solid electrolyte layer is produced by mixing a solid electrolyte, a binder for a solid electrolyte layer (polymer), an unsaturated acid metal salt monomer including a divalent metal, an organic solvent, and other components that are added as necessary.

In a case in which the presently disclosed functional layer for an all-solid-state secondary battery is not used as the solid electrolyte layer, the solid electrolyte layer can be any solid electrolyte layer described in JP2012243476A, JP2013143299A, or JP2016143614A, for example.

[Solid Electrolyte]

The solid electrolyte can be any of the same solid electrolytes as given as examples for the slurry composition for an all-solid-state secondary battery.

[Binder for Solid Electrolyte Layer]

The binder for a solid electrolyte layer is used to bind the solid electrolyte and thereby form the solid electrolyte layer. The binder for a solid electrolyte layer may include the polymer that is a constituent of the binder composition for an all-solid-state secondary battery.

[Unsaturated Acid Metal Salt Monomer]

The unsaturated acid metal salt monomer can be any of the same unsaturated acid metal salt monomers as given as examples for the binder composition for an all-solid-state secondary battery.

[Organic Solvent]

Any of the "organic solvents having a boiling point of not lower than 100° C. and not higher than 250° C." given above as examples for the previously described binder composition for an all-solid-state secondary battery can suitably be used as the organic solvent.

[Other Components]

The slurry composition for a solid electrolyte layer may contain additives exhibiting various functions such as conductive agents and reinforcing materials as other components that are added as necessary in addition to the components described above (solid electrolyte, binder for solid electrolyte layer, unsaturated acid metal salt monomer, and organic solvent). No specific limitations are placed on these other components so long as they do not influence battery reactions.

[[Conductive Agent]]

Any conductive agent can be used without any specific limitations so long as it can impart electrical conductivity. Typical examples include carbon powders such as acetylene black, carbon black, and graphite; fibers of various metals; and foils of various metals.

[[Reinforcing Material]]

Inorganic fillers and organic fillers having a spherical, plate-like, rod-like, or fibrous form can be used as reinforcing materials.

[[Non-Conductive Particles]]

Inorganic particles and organic particles can be used without any specific limitations as non-conductive particles.

Examples of inorganic particles that can be used include particles of oxides such as aluminum oxide (alumina), silicon oxide, magnesium oxide, titanium oxide, $BaTiO_2$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite.

Examples of organic particles that can be used include particles of various cross-linked polymers such as polyethylene, polystyrene, polydivinylbenzene, cross-linked styrene-divinylbenzene copolymer, polyimide, polyamide, polyamide-imide, melamine resin, phenolic resin, and benzoguanamine-formaldehyde condensate; and particles of heat-resistant polymers such as polysulfone, polyacrylonitrile, polyaramid, polyacetal, and thermoplastic polyimide.

<Positive Electrode Active Material Layer>

In a case in which the presently disclosed functional layer for an all-solid-state secondary battery is used as the positive electrode active material layer, the positive electrode active material layer is formed by applying a slurry composition for a positive electrode active material layer onto the surface of a subsequently described current collector, and then drying the slurry composition. The slurry composition for a positive electrode active material layer is produced by mixing a positive electrode active material, a solid electrolyte, a binder for a positive electrode (polymer), an unsaturated acid metal salt monomer including a divalent metal, an organic solvent, and other components that are added as necessary.

In a case in which the presently disclosed functional layer for an all-solid-state secondary battery is not used as the positive electrode active material layer, any of the positive electrode active material layers described in JP 2016-181471 A and JP 2016-181472 A, for example, can be used as the positive electrode active material layer without any specific limitations.

[Positive Electrode Active Material]

The positive electrode active material is a compound that can occlude and release lithium ions. Examples of positive electrode active materials that can be used include positive electrode active materials formed of inorganic compounds, positive electrode active materials formed of organic compounds, and mixtures of an inorganic compound and an organic compound.

The average particle diameter of the positive electrode active material is preferably 0.1 μm or more, and more preferably 1 μm or more, and is preferably 50 μm or less, and more preferably 20 μm or less from a viewpoint of (i) battery characteristics such as load characteristics, charge/discharge cycle characteristics, and charge/discharge capacity, (ii) handling of the slurry composition for a positive electrode active material layer, and (iii) handling during positive electrode production. Note that the average particle diameter of the positive electrode active material is the number-average particle diameter, which can be determined through measurement of a particle size distribution by laser diffraction.

[[Positive Electrode Active Material Formed of Inorganic Compound]]

Examples of positive electrode active materials formed of inorganic compounds include (i) transition metal oxides, (ii) complex oxides of lithium and a transition metal such as Fe, Co, Ni, or Mn (lithium-containing complex metal oxides), and (iii) transition metal sulfides.

Examples of (i) transition metal oxides include $Cu_2V_2O_3$, amorphous $V_2O-P_2O_5$, $MoO_3$, $V_2O_5$, and $V_6O_{13}$. These compounds may have undergone partial element substitution.

Examples of (ii) lithium-containing complex metal oxides include $LiCoO_2$ (lithium cobalt oxide), $LiNiO_2$, $LiMnO_2$, $LiMn_2O_4$, $LiFePO_4$, and $LiFeVO_4$. These compounds may have undergone partial element substitution.

Examples of (iii) transition metal sulfides include $TiS_2$, $TiS_3$, and amorphous $MoS_2$. These compounds may have undergone partial element substitution.

[[Positive Electrode Active Material Formed of Organic Compound]]

Examples of positive electrode active materials formed of organic compounds include polyaniline, polypyrrole, polyacene, disulfide compounds, polysulfide compounds, and N-fluoropyridinium salts.

[Solid Electrolyte]

The solid electrolyte can be any of the same solid electrolytes as given as examples for the slurry composition for an all-solid-state secondary battery.

The mass ratio of the positive electrode active material and the solid electrolyte (positive electrode active material: solid electrolyte) is preferably 90:10 to 50:50, and more preferably 80:20 to 60:40. When the mass ratio of the positive electrode active material and the solid electrolyte is within any of the ranges set forth above, it is possible to inhibit a phenomenon of battery capacity decreasing as a result of the mass of the positive electrode active material in the battery decreasing due to the mass ratio of the positive electrode active material being too small, and it is also possible to inhibit a phenomenon of battery capacity decreasing as a result of electrical conductivity being insufficient and the positive electrode active material not being effectively used due to the mass ratio of the solid electrolyte being too small.

[Binder for Positive Electrode]

The binder for a positive electrode is used in order to bind the positive electrode active material and the solid electrolyte and to thereby form the positive electrode active material layer. The binder for a positive electrode may include the polymer that is a constituent of the binder composition for an all-solid-state secondary battery.

The content of the binder for a positive electrode in the slurry composition for a positive electrode active material layer in terms of solid content per 100 parts by mass of the positive electrode active material is preferably 0.1 parts by mass or more, and more preferably 0.2 parts by mass or more, and is preferably 5 parts by mass or less, and more preferably 4 parts by mass or less from a viewpoint of preventing detachment of the positive electrode active material from the electrode without impairing battery reactions.

[Unsaturated Acid Metal Salt Monomer]

The unsaturated acid metal salt monomer can be any of the same unsaturated acid metal salt monomers as given above as examples for the binder composition for an all-solid-state secondary battery.

[Organic Solvent]

Any of the "organic solvents having a boiling point of not lower than 100° C. and not higher than 250° C." that were given as examples for the previously described binder composition for an all-solid-state secondary battery can suitably be used as the organic solvent.

The content of the organic solvent in the slurry composition for a positive electrode active material layer per 100 parts by mass of the positive electrode active material is preferably 20 parts by mass or more, and more preferably 30 parts by mass or more, and is preferably 80 parts by mass or less, and more preferably 70 parts by mass or less from a viewpoint of obtaining good coating characteristics while maintaining dispersibility of the solid electrolyte.

[Other Components]

The slurry composition for a positive electrode active material layer may contain additives exhibiting various functions such as the previously described conductive agents, the previously described reinforcing materials, and the previously described non-conductive particles as other components that are added as necessary in addition to the components described above (positive electrode active material, solid electrolyte, binder for positive electrode, unsaturated acid metal salt monomer, and organic solvent). No specific limitations are placed on these other components so long as they do not influence battery reactions.

<Negative Electrode Active Material Layer>

In a case in which the presently disclosed functional layer for an all-solid-state secondary battery is used as the negative electrode active material layer, the negative electrode active material layer is formed by applying a slurry composition for a negative electrode active material layer onto the surface of a subsequently described current collector, and then drying the slurry composition. The slurry composition for a negative electrode active material layer is produced by mixing a negative electrode active material, a solid electrolyte, a binder for a negative electrode, an unsaturated acid metal salt monomer including a divalent metal, an organic solvent, and other components that are added as necessary.

In a case in which the presently disclosed functional layer for an all-solid-state secondary battery is not used as the negative electrode active material layer, any of the negative electrode active material layers described in JP2016181471A and JP2016181472A, for example, can be used as the negative electrode active material layer without any specific limitations.

[Negative Electrode Active Material]

Examples of negative electrode active materials that may be used include carbon allotropes such as graphite and coke; oxides and sulfuric acid salts of silicon, tin, zinc, manganese, iron, nickel, and the like; lithium metal; lithium alloys such as Li—Al, Li—Bi—Cd, and Li—Sn—Cd; lithium transition metal nitrides; and silicon. In a case in which the negative electrode active material is formed of a carbon allotrope, the carbon allotrope may be used in a mixed or coated form with a metal, a metal salt, an oxide, or the like. Moreover, in a case in which the negative electrode active material is a metal material, the metal material may be used as an electrode in the form of a metal foil or a metal plate, or may be used in a particulate form.

In a case in which the negative electrode active material is in a particulate form, the average particle diameter of the negative electrode active material is preferably 1 μm or more, and more preferably 15 μm or more, and is preferably 50 μm or less, and more preferably 30 μm or less from a viewpoint of improving battery characteristics such as initial efficiency, load characteristics, and charge/discharge cycle characteristics. Note that the average particle diameter of the negative electrode active material is the number-average particle diameter, which can be determined through measurement of a particle size distribution by laser diffraction.

[Solid Electrolyte]

The solid electrolyte can be any of the same solid electrolytes as given as examples for the slurry composition for an all-solid-state secondary battery.

The mass ratio of the negative electrode active material and the solid electrolyte (negative electrode active material: solid electrolyte) is preferably 90:10 to 50:50, and more preferably 80:20 to 60:40. When the mass ratio of the negative electrode active material and the solid electrolyte is within any of the ranges set forth above, it is possible to inhibit a phenomenon of battery capacity decreasing as a result of the mass of the negative electrode active material in the battery decreasing due to the mass ratio of the negative electrode active material being too small, and it is also possible to inhibit a phenomenon of battery capacity decreasing as a result of electrical conductivity being insufficient and the negative electrode active material not being effectively used due to the mass ratio of the solid electrolyte being too small.

[Binder for Negative Electrode]

The binder for a negative electrode is used in order to bind the negative electrode active material and the solid electrolyte and to thereby form the negative electrode active material layer. The binder for a negative electrode may include the polymer that is a constituent of the binder composition for an all-solid-state secondary battery.

The content of the binder for a negative electrode in the slurry composition for a negative electrode active material layer in terms of solid content per 100 parts by mass of the negative electrode active material is preferably 0.1 parts by mass or more, and more preferably 0.2 parts by mass or more, and is preferably 5 parts by mass or less, and more preferably 4 parts by mass or less from a viewpoint of preventing detachment of the negative electrode active material from the electrode without impairing battery reactions.

[Unsaturated Acid Metal Salt Monomer]

The unsaturated acid metal salt monomer can be any of the same unsaturated acid metal salt monomers as given as examples for the binder composition for an all-solid-state secondary battery.

[Organic Solvent]

Any of the "organic solvents having a boiling point of not lower than 100° C. and not higher than 250° C." that were given above as examples for the previously described binder composition for an all-solid-state secondary battery can suitably be used as the organic solvent.

[Other Components]

The slurry composition for a negative electrode active material layer may contain additives exhibiting various functions such as the previously described conductive agents, the previously described reinforcing materials, and the previously described non-conductive particles as other components that are added as necessary in addition to the components described above (negative electrode active material, solid electrolyte, binder for negative electrode, unsaturated acid metal salt monomer, and organic solvent). No specific limitations are placed on these other components so long as they do not influence battery reactions.

[Current Collector]

A current collector used in formation of the positive electrode active material layer or the negative electrode active material layer is not specifically limited so long as it is a current collector formed of a material having electrical conductivity and electrochemical durability. A current collector formed of a metal material such as iron, copper, aluminum, nickel, stainless steel, titanium, tantalum, gold, or platinum is suitable from a viewpoint of heat resistance. One of the metal materials described above may be used individually, or two or more of the metal materials described above may be used in combination in a freely selected ratio.

Of these examples, a current collector formed of aluminum is particularly preferable as a current collector for a positive electrode, whereas a current collector formed of copper is particularly preferable as a current collector for a negative electrode.

Although no specific limitations are placed on the shape of the current collector, the current collector preferably has a sheet shape of approximately 0.001 mm to 0.5 mm in thickness. The current collector is preferably subjected to surface roughening before use in order to increase adhesion strength with the positive/negative electrode active material layer described above. The method of surface roughening may, for example, be a mechanical polishing method, an electrolytic polishing method, or a chemical polishing method. The mechanical polishing is performed, for example, using a coated abrasive to which abrasive grains are bonded, a whetstone, an emery wheel, or a wire brush including steel wire or the like. An intermediate layer such as a conductive adhesive layer may be formed on the surface of the current collector in order to increase electrical conductivity and/or adhesion strength of the current collector with the positive/negative electrode active material layer.

No specific limitations are placed on the method by which each of the above-described slurry compositions (slurry composition for solid electrolyte layer, slurry composition for positive electrode active material layer, and slurry composition for negative electrode active material layer) is mixed. For example, a method using a mixing apparatus such as a stirring-type apparatus, a shaking-type apparatus, or a rotary-type apparatus may be adopted.

Moreover, examples of methods by which each of the slurry compositions described above can be mixed include a method in which a dispersing and kneading apparatus such as a homogenizer, a ball mill, a bead mill, a planetary mixer, a sand mill, a roll mill, or a planetary kneader is used. Of these examples, a method in which a planetary mixer, a ball mill, or a bead mill is used is preferable from a viewpoint of inhibiting solid electrolyte aggregation.

<Production of all-Solid-State Secondary Battery>

The positive electrode of the all-solid-state secondary battery is obtained by forming a positive electrode active material layer on a current collector. The positive electrode active material layer is formed by applying the above-described slurry composition for a positive electrode active material layer onto the current collector and then drying the slurry composition.

In a case in which a metal foil or a metal plate is used as a negative electrode active material, the metal foil or metal plate may be used in that form as the negative electrode of the all-solid-state secondary battery. In a case in which the negative electrode active material is in a particulate form, the negative electrode is obtained by forming a negative electrode active material layer on a separate current collector to the current collector of the positive electrode. The negative electrode active material layer is formed by applying the above-described slurry composition for a negative electrode active material layer onto the separate current collector to the current collector of the positive electrode and then drying the slurry composition.

Next, the slurry composition for a solid electrolyte layer is applied onto the positive electrode active material layer or the negative electrode active material layer that has been formed and is dried to form a solid electrolyte layer. The electrode on which the solid electrolyte layer is not formed and the electrode on which the solid electrolyte layer is formed are pasted together to produce an all-solid-state secondary battery device.

No specific limitations are placed on the method by which a slurry composition for an electrode active material layer is applied onto a current collector. Examples of applications methods that can be used include doctor blading, dip coating, reverse roll coating, direct roll coating, gravure coating, extrusion coating, and brush coating.

Although no specific limitations are placed on the amount of the slurry composition for an electrode active material layer that is applied, the amount is normally set such that the thickness of the active material layer formed after removal of organic solvent is 5 μm to 300 μm, and preferably 10 μm to 250 μm.

The drying method of the slurry composition for an electrode active material layer is not specifically limited and examples of drying methods that may be used include (i) drying by warm, hot, or low-humidity air, (ii) drying in a vacuum, and (iii) drying through irradiation with (far) infrared rays, electron beams, or the like. The drying conditions are normally adjusted such that the organic solvent is volatilized as quickly as possible within a rate range for which cracks do not form in the electrode active material layer due to stress concentration and for which peeling of the electrode active material layer from the current collector does not occur.

Moreover, an electrode obtained after drying may be pressed in order to stabilize the electrode. Examples of pressing methods that may be used include mold pressing and calender pressing, but these examples are not limiting.

The drying temperature is a temperature at which sufficient volatilization of the organic solvent occurs. Specifically, the drying temperature is preferably 50° C. or higher, and more preferably 80° C. or higher, and is preferably 250° C. or lower, and more preferably 200° C. or lower from a viewpoint of forming a good active material layer without thermal decomposition of the binder for a positive electrode or the binder for a negative electrode. The drying time is not specifically limited but is normally not less than 10 minutes and not more than 60 minutes.

The slurry composition for a solid electrolyte layer can, without any specific limitations, be applied onto the positive electrode active material layer or the negative electrode active material layer by any of the same methods as previously described as methods of applying the slurry composition for an electrode active material layer onto a current collector, but gravure coating is preferable from a viewpoint of forming the solid electrolyte layer as a thin film.

Although no specific limitations are placed on the amount of the slurry composition for a solid electrolyte layer that is applied, the amount is normally set such that the thickness of the solid electrolyte layer formed after removal of organic solvent is 2 μm to 20 μm, and preferably 3 μm to 15 μm.

The drying method, drying conditions, and drying temperature of the slurry composition for a solid electrolyte layer may be the same as for the previously described drying method of the slurry composition for an electrode active material layer.

A laminate obtained by pasting together the electrode on which the solid electrolyte layer is formed and the electrode on which the solid electrolyte layer is not formed may be subjected to pressing.

The method of pressing is not specifically limited and may be flat plate pressing, roll pressing, cold isostatic pressing (CIP), or the like.

The pressure with which pressing is performed is preferably 5 MPa or more, and more preferably 7 MPa or more, and is preferably 700 MPa or less, and more preferably 500 MPa or less from a viewpoint of lowering resistance at each interface between the electrodes and the solid electrolyte layer, lowering contact resistance between particles in each of the layers, and achieving good battery characteristics.

Although no specific limitations are placed on whether the slurry composition for a solid electrolyte layer is applied onto the positive electrode active material layer or the negative electrode active material layer, it is preferable that the slurry composition for a solid electrolyte layer is applied onto whichever of the active material layers contains an electrode active material having a larger particle diameter. Since protrusions and depressions are formed at the surface of an active material layer containing an electrode active material that has a large particle diameter, applying the slurry composition for a solid electrolyte layer onto such an electrode active material layer can lessen the protrusions and depressions at the surface of the electrode active material layer. As a consequence, when the electrode on which the solid electrolyte layer is formed and the electrode on which the solid electrolyte layer is not formed are pasted together and laminated, contact area between the solid electrolyte layer and the electrodes can be increased, and interface resistance can be suppressed.

The all-solid-state secondary battery device obtained as described above is placed in a battery container either as obtained or after rolling, folding, or the like in accordance with the battery shape, and then the battery container is sealed to obtain an all-solid-state secondary battery.

Moreover, an expanded metal; a fuse; an overcurrent preventing device such as a PTC device; a lead plate; or the like may be placed in the battery container as necessary in order to prevent pressure increase inside the battery and the occurrence of overcharging or overdischarging.

The shape of the all-solid-state secondary battery may be a coin type, button type, sheet type, cylinder type, prismatic type, flat type, or the like.

EXAMPLES

The following describes the present disclosure through examples. However, the present disclosure is not limited to these examples. Note that "parts" and "%" in the present examples are by mass unless otherwise specified. In the examples and comparative examples, "observation of coating film external appearance", "observation of cracking and chipping during pressing and presser staining", and "resistance value measurement" were carried out as described below.

<Observation of Coating Film External Appearance>

A slurry composition for a solid electrolyte layer produced in each example or comparative example was applied onto one side of aluminum foil of 14 μm in thickness by a coater having a gap of 200 μm and was dried by an 80° C. hot plate to form a solid electrolyte layer and thereby obtain a test specimen.

The presence of cracks in the surface of the obtained test specimen was checked by eye. A case in which cracks were not observed was evaluated as "Good" and a case in which cracks were observed was evaluated as "Poor". The results are shown in Table 1. An all-solid-state secondary battery in which a coating film in which cracks have formed is used as a solid electrolyte layer is expected to have poor battery performance.

<Observation of Cracking and Chipping During Pressing and Presser Staining>

A slurry composition for a solid electrolyte layer produced in each example or comparative example was applied onto one side of aluminum foil of 14 μm in thickness by a coater having a gap of 200 μm and was dried by an 80° C. hot plate to form a solid electrolyte layer and thereby obtain a test specimen. The test specimen was punched using a metal punch of 10 mm in diameter. The occurrence of cracking of the test specimen and chipping of the edge of the test specimen were inspected at this time.

In a case in which cracking and chipping of the test specimen did not occur, the test specimen was then compacted by a pressing machine at a pressure of 2 MPa. The end surface of a metal round bar used as a presser in the pressing was observed. Staining due to solid electrolyte becoming attached to the surface, binder polymer remaining on the surface, or the like was visually checked. The absence of staining indicates excellent processability.

A case in which staining was not observed even for 1 of 20 test specimens was evaluated as "Good" and a case in which staining was observed was evaluated as "Poor". The results are shown in Table 1.

<Resistance Value Measurement>

A slurry composition for a solid electrolyte layer produced in each example or comparative example was applied onto one side of aluminum foil of 14 μm in thickness by a coater having a gap of 200 μm and was dried by an 80° C. hot plate to form a solid electrolyte layer. The solid electrolyte layer was then sandwiched by the same aluminum foil, the resultant test specimen was punched using a metal punch of 10 mm in diameter, and then the punched test specimen was compacted by a pressing machine at a pressure of 2 MPa. A resistance value of the solid electrolyte layer produced in each example or comparative example that was used in pressing was determined through measurement using an impedance meter and calculation from a Nyquist plot. The results are shown in Table 1. A smaller value for the resistance value indicates that an all-solid-state secondary battery having better battery performance is obtainable.

Example 1

<Production of Binder Composition for all-Solid-State Secondary Battery>

A reactor equipped with a stirrer was charged with 59 parts of 2-ethylhexyl acrylate, 20 parts of styrene, 20 parts of butyl acrylate, 1 part of ethylene glycol dimethacrylate (EGDMA) as a cross-linker, 1 part of sodium dodecylbenzenesulfonate (DBS) as an emulsifier, 150 parts of deionized water, and 0.5 parts of potassium persulfate (KPS) as a polymerization initiator. These materials were sufficiently stirred and were then heated to 70° C. to initiate polymerization. Cooling was initiated at the point at which the polymerization conversion rate reached 96% to quench the reaction to yield a water dispersion of a particulate polymer.

Next, the obtained water dispersion was adjusted to pH 7 using 10 wt % NaOH aqueous solution.

Note that the glass-transition temperature of the obtained particulate polymer was measured as follows.

<<Measurement of Glass-Transition Temperature of Particulate Polymer>>

The produced water dispersion of the particulate polymer was used as a measurement sample. After weighing 10 mg of the measurement sample into an aluminum pan, measurement thereof was performed under conditions prescribed by JIS Z 8703 in a temperature range of −100° C. to 500° C. and at a heating rate of 10° C./min using a differential thermal analyzer (EXSTAR DSC6220 produced by SIT NanoTechnology Inc.) so as to obtain a differential scanning calorimetry (DSC) curve. Note that an empty aluminum pan was used as a reference. In the heating process, an intersection point of the baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

The water dispersion of the polymer that had been adjusted to pH 7 was subjected to thermal-vacuum treatment to remove unreacted monomer and was then adjusted to a solid content concentration of 30 wt % through addition of deionized water.

Under stirring, 10 g of a 1 mass % aqueous solution of magnesium diacrylate (reagent of Sigma-Aldrich Corporation) as an unsaturated acid metal salt monomer was added to 50 g of the obtained water dispersion of the polymer.

Next, 500 g of xylene was added, and then water was removed under heating to 80° C. in an evaporator so as to produce a binder composition for an all-solid-state secondary battery (solid content concentration: 7 mass %) having a water content of 82 ppm.

Note that the proportion in which magnesium diacrylate was contained in the binder composition for an all-solid-state secondary battery was 0.67 (=10×0.01×(100/(50×0.3))) parts by mass per 100 parts by mass of the particulate polymer.

<Production of Slurry Composition for all-Solid-State Secondary Battery>

A slurry composition for a solid electrolyte layer (slurry composition for an all-solid-state secondary battery) was produced in a glove box under an argon gas atmosphere (water concentration: 0.6 ppm; oxygen concentration: 1.8 ppm) by mixing 100 parts of sulfide glass composed of $Li_2S$ and $P_2S_5$ ($Li_2S/P_2S_5$=70 mol %/30 mol %; number-average particle diameter: 1.2 μm; D90 particle diameter: 2.1 μm) as solid electrolyte particles and 2 parts in terms of solid content of the binder composition for an all-solid-state secondary battery, further adding xylene as an organic solvent to adjust the solid content concentration to 65 mass %, and subsequently performing mixing using a planetary mixer.

The slurry composition for a solid electrolyte layer (slurry composition for an all-solid-state secondary battery) had a solid content concentration of 65 mass %.

A coating film was produced and the external appearance thereof was observed. Thereafter, the coating film was punched to a diameter of 10 mm, the occurrence of cracking and chipping during pressing and presser staining were observed, and then a resistance value was measured. The results are shown in Table 1.

Example 2

Measurement of the glass-transition temperature of a particulate polymer, production of a binder composition for an all-solid-state secondary battery, production of a slurry composition for an all-solid-state secondary battery, observation of coating film external appearance, observation of cracking and chipping during pressing and presser staining, and measurement of a resistance value were performed in the same way as in Example 1 with the exception that in Example 1, the additive amount of the 1 mass % aqueous solution of magnesium diacrylate was changed from 10 g to 300 g. The results are shown in Table 1.

Note that the binder composition for an all-solid-state secondary battery had a water content of 74 ppm and a solid content concentration of 7 mass %.

Moreover, the proportion in which magnesium diacrylate was contained in the binder composition for an all-solid-state secondary battery was 20 (=300×0.01×(100/(50×0.3))) parts by mass per 100 parts by mass of the particulate polymer.

Furthermore, the slurry composition for a solid electrolyte layer had a solid content concentration of 62 mass %.

Example 3

A reactor equipped with a stirrer was charged with 49 parts of 2-ethylhexyl acrylate, 20 parts of styrene, 15 parts of butyl acrylate, 15 parts of acrylonitrile, 1 part of ethylene glycol dimethacrylate (EGDMA) as a cross-linker, 1 part of sodium dodecylbenzenesulfonate (DBS) as an emulsifier, 150 parts of deionized water, and 0.5 parts of potassium persulfate (KPS) as a polymerization initiator. These materials were sufficiently stirred and were then heated to 70° C. to initiate polymerization. Cooling was initiated at the point at which the polymerization conversion rate reached 96% to quench the reaction to yield a water dispersion of a particulate polymer.

Measurement of the glass-transition temperature of the particulate polymer, production of a binder composition for an all-solid-state secondary battery, production of a slurry composition for an all-solid-state secondary battery, observation of coating film external appearance, observation of cracking and chipping during pressing and presser staining, and measurement of a resistance value were then performed in the same way as in Example 1. The results are shown in Table 1.

Note that the binder composition for an all-solid-state secondary battery had a water content of 66 ppm and a solid content concentration of 6.2 mass %.

Moreover, the proportion in which magnesium diacrylate was contained in the binder composition for an all-solid-state secondary battery was 0.67 (=10×0.01×(100/(50×0.3))) parts by mass per 100 parts by mass of the particulate polymer.

Furthermore, the slurry composition for a solid electrolyte layer (slurry composition for an all-solid-state secondary battery) had a solid content concentration of 62 mass %.

Example 4

A pressure-resistant reactor equipped with a stirrer was charged with 59 parts of 1,2-butadiene, 30 parts of styrene, 10 parts of butyl acrylate, 1 part of ethylene glycol dimethacrylate (EGDMA) as a cross-linker, 1 part of sodium dodecylbenzenesulfonate (DBS) as an emulsifier, 150 parts of deionized water, and 0.5 parts of potassium persulfate (KPS) as a polymerization initiator. These materials were sufficiently stirred and were then heated to 60° C. to initiate polymerization. Cooling was initiated at the point at which the polymerization conversion rate reached 96% to quench the reaction to yield a water dispersion of a particulate polymer.

Measurement of the glass-transition temperature of the particulate polymer, production of a binder composition for an all-solid-state secondary battery, production of a slurry composition for an all-solid-state secondary battery, observation of coating film external appearance, observation of cracking and chipping during pressing and presser staining, and measurement of a resistance value were then performed in the same way as in Example 1. The results are shown in Table 1.

Note that the binder composition for an all-solid-state secondary battery had a water content of 95 ppm and a solid content concentration of 5.6 mass %.

Moreover, the proportion in which magnesium diacrylate was contained in the binder composition for an all-solid-state secondary battery was 0.67 (=10×0.01×(100/(50×0.3))) parts by mass per 100 parts by mass of the particulate polymer.

Furthermore, the slurry composition for a solid electrolyte layer had a solid content concentration of 62 mass %.

Example 5

Measurement of the glass-transition temperature of a particulate polymer, production of a binder composition for an all-solid-state secondary battery, production of a slurry composition for an all-solid-state secondary battery, observation of coating film external appearance, observation of cracking and chipping during pressing and presser staining, and measurement of a resistance value were performed in the same way as in Example 1 with the exception that in Example 1, a 1 mass % aqueous solution of copper diacrylate was added instead of adding a 1 mass % aqueous solution of magnesium diacrylate. The results are shown in Table 1.

Note that the binder composition for an all-solid-state secondary battery had a water content of 90 ppm and a solid content concentration of 6.6 mass %.

Moreover, the proportion in which copper diacrylate was contained in the binder composition for an all-solid-state secondary battery was 0.67 (=10×0.01×(100/(50×0.3))) parts by mass per 100 parts by mass of the particulate polymer.

Furthermore, the slurry composition for a solid electrolyte layer had a solid content concentration of 65 mass %.

Example 6

Measurement of the glass-transition temperature of a particulate polymer, production of a binder composition for an all-solid-state secondary battery, production of a slurry composition for an all-solid-state secondary battery, observation of coating film external appearance, observation of cracking and chipping during pressing and presser staining, and measurement of a resistance value were performed in the same way as in Example 3 with the exception that in Example 3, the additive amount of the 1 mass % aqueous solution of magnesium diacrylate was changed from 10 g to 30 g. The results are shown in Table 1.

Note that the binder composition for an all-solid-state secondary battery had a water content of 85 ppm and a solid content concentration of 5.8 mass %.

Moreover, the proportion in which magnesium diacrylate was contained in the binder composition for an all-solid-state secondary battery was 2 (=30×0.01×(100/(50×0.3))) parts by mass per 100 parts by mass of the particulate polymer.

Furthermore, the slurry composition for a solid electrolyte layer had a solid content concentration of 60 mass %.

Example 7

Measurement of the glass-transition temperature of a particulate polymer, production of a binder composition for an all-solid-state secondary battery, production of a slurry composition for an all-solid-state secondary battery, observation of coating film external appearance, observation of cracking and chipping during pressing and presser staining, and measurement of a resistance value were performed in the same way as in Example 1 with the exception that in Example 1, the additive amount of the 1 mass % aqueous solution of magnesium diacrylate was changed from 10 g to 400 g. The results are shown in Table 1.

Note that the binder composition for an all-solid-state secondary battery had a water content of 74 ppm and a solid content concentration of 5.8 mass %.

Moreover, the proportion in which magnesium diacrylate was contained in the binder composition for an all-solid-state secondary battery was 26.7 (=400×0.01×(100/(50×0.3))) parts by mass per 100 parts by mass of the particulate polymer.

Furthermore, the slurry composition for a solid electrolyte layer had a solid content concentration of 65 mass %.

Comparative Example 1

A particulate polymer dispersion liquid having a solid content concentration of 30% was produced in the same way as in Example 1, 500 g of xylene was added to 50 g of the particulate polymer dispersion liquid without adding an aqueous solution of an unsaturated acid metal salt monomer, and then water was removed under heating to 80° C. in an evaporator to thereby produce a binder composition for an all-solid-state secondary battery (solid content concentration: 7 mass %) having a water content of 85 ppm.

Measurement of the glass-transition temperature of the particulate polymer, production of a slurry composition for an all-solid-state secondary battery, observation of coating film external appearance, observation of cracking and chipping during pressing and presser staining, and measurement of a resistance value were performed in the same way as in Example 1 using the produced binder composition for an all-solid-state secondary battery. The results are shown in Table 1.

Note that in observation of coating film external appearance, cracks were observed in part of the surface of the coating film. In observation of cracking and chipping during pressing, chipping of part of the circumference of the test specimen was observed when the test specimen was punched using a punch of 10 mm in diameter.

Note that the slurry composition for a solid electrolyte layer (slurry composition for an all-solid-state secondary battery) had a solid content concentration of 65 mass %.

Comparative Example 2

Measurement of the glass-transition temperature of a particulate polymer, production of a binder composition for an all-solid-state secondary battery, production of a slurry composition for an all-solid-state secondary battery, observation of coating film external appearance, observation of cracking and chipping during pressing and presser staining, and measurement of a resistance value were performed in the same way as in Example 1 with the exception that in Example 1, a 1 mass % aqueous solution of sodium acrylate was added instead of adding a 1 mass % aqueous solution of magnesium diacrylate. The results are shown in Table 1.

Note that the binder composition for an all-solid-state secondary battery had a water content of 77 ppm and a solid content concentration of 5.2 mass %.

Moreover, the proportion in which sodium acrylate was contained in the binder composition for an all-solid-state secondary battery was 0.67 (=10×0.01×(100/(50×0.3))) parts by mass per 100 parts by mass of the particulate polymer.

Furthermore, the slurry composition for a solid electrolyte layer had a solid content concentration of 60 mass %.

Comparative Example 3

Measurement of the glass-transition temperature of a particulate polymer, production of a binder composition for an all-solid-state secondary battery, production of a slurry composition for an all-solid-state secondary battery, observation of coating film external appearance, observation of cracking and chipping during pressing and presser staining, and measurement of a resistance value were performed in the same way as in Comparative Example 1 with the exception that in Comparative Example 1, the solid content concentration of the slurry composition for a solid electrolyte layer (slurry composition for an all-solid-state secondary battery) was changed from 65 mass % to 30 mass %. The results are shown in Table 1.

TABLE 1

| | | | Example 1 | Example 2 | Example 3 | Example 4 | Example 5 |
|---|---|---|---|---|---|---|---|
| Water dispersion of particulate polymer | Monomer | 2-Ethylhexyl acrylate | 59 | 59 | 49 | — | 59 |
| | | Styrene | 20 | 20 | 20 | 30 | 20 |
| | | Butyl acrylate | 20 | 20 | 15 | 10 | 20 |
| | | Acrylonitrile | — | — | 15 | — | — |
| | | 1,3-Butadiene | — | — | — | 59 | — |
| | Cross-linker | EGDMA | 1 | 1 | 1 | 1 | 1 |
| | Emulsifier | DBS | 1 | 1 | 1 | 1 | 1 |
| | Initiator | KPS | 0.5 | 0.5 | 0.5 | 0.5 | 0.5 |
| | Water | | 150 | 150 | 150 | 150 | 150 |
| | Glass-transition temperature (° C.) | | −32 | −32 | −10 | −43 | −32 |
| Solvent | | | Xylene | Xylene | Xylene | Xylene | Xylene |
| Unsaturated acid metal salt monomer | | | Magnesium diacrylate | Magnesium diacrylate | Magnesium diacrylate | Magnesium diacrylate | Copper diacrylate |
| Unsaturated acid metal salt monomer 1% aqueous solution (g) | | | 10 | 300 | 10 | 10 | 10 |
| Proportion of unsaturated acid metal salt monomer per 100 parts by mass of polymer (%) | | | 0.1 | 3 | 0.1 | 0.1 | 0.1 |
| Binder composition water content (ppm) | | | 82 | 74 | 66 | 95 | 90 |
| Binder composition solid content concentration (mass %) | | | 7 | 7 | 6.2 | 5.6 | 6.6 |
| Slurry solid content concentration (mass %) | | | 65 | 65 | 62 | 62 | 65 |
| Coating film external appearance | | | Good | Good | Good | Good | Good |
| Observation of cracking and chipping during pressing | | | No cracking or chipping | No cracking or chipping | No cracking or chipping | No cracking or chipping | No cracking or chipping |
| Observation of presser staining | | | Good | Good | Good | Good | Good |
| Resistance value | | | 2.8 | 3.1 | 3.3 | 4.1 | 3.8 |

| | | | Example 6 | Example 7 | Comparative Example 1 | Comparative Example 2 | Comparative Example 3 |
|---|---|---|---|---|---|---|---|
| Water dispersion of particulate polymer | Monomer | 2-Ethylhexyl acrylate | 49 | 59 | 59 | 59 | 59 |
| | | Styrene | 20 | 20 | 20 | 20 | 20 |
| | | Butyl acrylate | 15 | 20 | 20 | 20 | 20 |
| | | Acrylonitrile | 15 | — | — | — | — |
| | | 1,3-Butadiene | — | — | — | — | — |
| | Cross-linker | EGDMA | 1 | 1 | 1 | 1 | 1 |
| | Emulsifier | DBS | 1 | 1 | 1 | 1 | 1 |
| | Initiator | KPS | 0.5 | 0.5 | 0.5 | 0.5 | 0.5 |
| | Water | | 150 | 150 | 150 | 150 | 150 |
| | Glass-transition temperature (° C.) | | −10 | −32 | −32 | −32 | −32 |
| Solvent | | | Xylene | Xylene | Xylene | Xylene | Xylene |
| Unsaturated acid metal salt monomer | | | Magnesium diacrylate | Magnesium diacrylate | — | Sodium acrylate | — |
| Unsaturated acid metal salt monomer 1% aqueous solution (g) | | | 30 | 400 | 0 | 10 | 0 |
| Proportion of unsaturated acid metal salt monomer per 100 parts by mass of polymer (%) | | | 0.3 | 4 | 0 | 0.1 | 0 |
| Binder composition water content (ppm) | | | 85 | 74 | 85 | 77 | 85 |
| Binder composition solid content concentration (mass %) | | | 5.8 | 5.8 | 7 | 5.2 | 7 |
| Slurry solid content concentration (mass %) | | | 60 | 65 | 65 | 60 | 30 |
| Coating film external appearance | | | Good | Good | Poor | Poor | Good |
| Observation of cracking and chipping during pressing | | | No cracking or chipping | No cracking or chipping | Chipping | Chipping | No cracking or chipping |
| Observation of presser staining | | | Good | Good | — | — | Good |
| Resistance value | | | 3.5 | 3.1 | — | — | 3.3 |

It can be seen through comparison of Examples 1 to 7 and Comparative Examples 1 to 3 in Table 1 that when a binder composition for an all-solid-state secondary battery contains (i) a polymer, (ii) an unsaturated acid metal salt monomer including a divalent metal, and (iii) a solvent, it is possible to obtain an all-solid-state secondary battery that has good battery characteristics (low resistance value) and for which processability during all-solid-state secondary battery production is excellent.

The results of Comparative Example 1 in Table 1 demonstrate that in a case in which the used binder composition for a secondary battery does not contain an unsaturated acid metal salt monomer, gelation occurs and a smooth coating film cannot be formed if the solid content concentration of a slurry composition for a solid electrolyte layer is 65 mass %.

Moreover, the results of Comparative Example 2 in Table 1 demonstrate that in a case in which the used binder composition for a secondary battery contains an unsaturated acid metal salt monomer including a monovalent metal, gelation occurs and a smooth coating film cannot be formed when the solid content concentration of a slurry composition for a solid electrolyte layer is 60 mass %.

Furthermore, the results of Comparative Example 3 in Table 1 demonstrate that in a case in which the used binder composition for a secondary battery does not contain an unsaturated acid metal salt monomer, it is not possible to produce a slurry composition for a solid electrolyte layer (slurry composition for an all-solid-state secondary battery) (i.e., processability during all-solid-state secondary battery production is poor) unless a low solid content concentration is adopted.

INDUSTRIAL APPLICABILITY

According to the present disclosure, it is possible to obtain a binder composition for an all-solid-state secondary battery with which it is possible to obtain an all-solid-state secondary battery that has good battery characteristics and for which processability during all-solid-state secondary battery production is excellent, a slurry composition for an all-solid-state secondary battery that contains this binder composition for an all-solid-state secondary battery, a functional layer for an all-solid-state secondary battery that is formed from this slurry composition for an all-solid-state secondary battery, and an all-solid-state secondary battery that includes this functional layer for an all-solid-state secondary battery.

The invention claimed is:

1. A binder composition for an all-solid-state secondary battery comprising a polymer, an unsaturated acid metal salt monomer, and a solvent, wherein
the solvent is an organic solvent,
the unsaturated acid metal salt monomer includes a divalent metal, and
the binder composition has a water content of less than 1,000 ppm.

2. The binder composition for an all-solid-state secondary battery according to claim 1, wherein the unsaturated acid metal salt monomer is contained in a proportion of not less than 0.01 parts by mass and not more than 10 parts by mass per 100 parts by mass of the polymer.

3. The binder composition for an all-solid-state secondary battery according to claim 1, wherein the divalent metal is at least one selected from calcium, magnesium, copper, and zinc.

4. The binder composition for an all-solid-state secondary battery according to claim 1, wherein the unsaturated acid metal salt monomer includes at least two double bonds.

5. The binder composition for an all-solid-state secondary battery according to claim 1, wherein the unsaturated acid metal salt monomer is a metal (meth)acrylate monomer.

6. A slurry composition for an all-solid-state secondary battery comprising:
the binder composition for an all-solid-state secondary battery according to claim 1; and
a solid electrolyte.

7. A functional layer for an all-solid-state secondary battery formed from the slurry composition for an all-solid-state secondary battery according to claim 6.

8. An all-solid-state secondary battery comprising the functional layer for an all-solid-state secondary battery according to claim 7.

* * * * *